United States Patent
Famolari et al.

(10) Patent No.: US 6,865,167 B2
(45) Date of Patent: Mar. 8, 2005

(54) METHOD AND SYSTEM FOR SOFT HANDOFF IN WIRELESS CODE DIVISION MULTIPLE ACCESS (CDMA) INTERNET PROTOCOL (IP) NETWORKS

(75) Inventors: David Famolari, Montclair, NJ (US); David J. Marples, Notts (GB)

(73) Assignee: Telcordia Technologies, Inc., Piscataway, NJ (US)

( * ) Notice: Subject to any disclaimer, the term of this patent is extended or adjusted under 35 U.S.C. 154(b) by 822 days.

(21) Appl. No.: 09/775,864

(22) Filed: Feb. 2, 2001

(65) Prior Publication Data

US 2002/0105926 A1 Aug. 8, 2002

(51) Int. Cl.[7] .............................................. H04Q 7/00
(52) U.S. Cl. ...................... 370/331; 370/332; 455/436; 455/442
(58) Field of Search ................................. 370/331, 332, 370/352, 329, 335, 342, 328, 389, 392, 395.52, 270, 441, 280, 347, 432, 336, 338; 455/101, 442, 436, 437, 438, 439, 500, 517, 502, 562.1, 507, 422.1, 428, 429, 187.1

(56) References Cited

U.S. PATENT DOCUMENTS

| | | | | |
|---|---|---|---|---|
| 5,729,536 A | * | 3/1998 | Doshi et al. ................. | 370/398 |
| 5,761,619 A | * | 6/1998 | Danne et al. ............. | 455/422.1 |
| 6,104,709 A | * | 8/2000 | Rinchiuso et al. ........... | 370/335 |
| 6,144,651 A | * | 11/2000 | Rinchiuso et al. ........... | 370/335 |
| 6,473,411 B1 | * | 10/2002 | Kumaki et al. ............. | 370/331 |
| 6,519,248 B1 | * | 2/2003 | Valko .......................... | 370/352 |
| 6,690,659 B1 | * | 2/2004 | Ahmed et al. .............. | 370/328 |
| 6,707,813 B1 | * | 3/2004 | Hasan et al. ................ | 370/356 |
| 6,735,202 B1 | * | 5/2004 | Ahmed et al. .............. | 370/392 |
| 6,765,896 B1 | * | 7/2004 | Ahmed et al. .............. | 370/338 |
| 2001/0012279 A1 | * | 8/2001 | Haumont et al. ........... | 370/331 |
| 2002/0072382 A1 | * | 6/2002 | Fong et al. ................. | 455/507 |

OTHER PUBLICATIONS

U.S. Appl. No. 09/883,569, pending, Famolari et al.
U.S. Appl. No. 09/884,727, pending, Famolari.

* cited by examiner

*Primary Examiner*—Wellington Chin
*Assistant Examiner*—Jamal A. Fox
(74) *Attorney, Agent, or Firm*—Joseph Giordano

(57) ABSTRACT

A method and system for soft handoff of a mobile terminal in a wireless CDMA IP network utilizes IP multicasting to a plurality of multicast participants that reside at the mobile terminal. A soft handoff multicast protocol is used to assign a unique IP multicasting address to the mobile terminal and establish a plurality of multicast participants that reside at the mobile terminal, thereby creating corresponding multicast network connections between the IP network and the mobile terminal. The IP network simultaneously transmits information to the mobile terminal via the multicast network connections by broadcasting the information as a multicast message to the mobile terminal's multicast group. The multicast extends between a mobile terminal and a plurality of a base station associated with the network to simultaneously communicate information over separate communication channels.

12 Claims, 5 Drawing Sheets

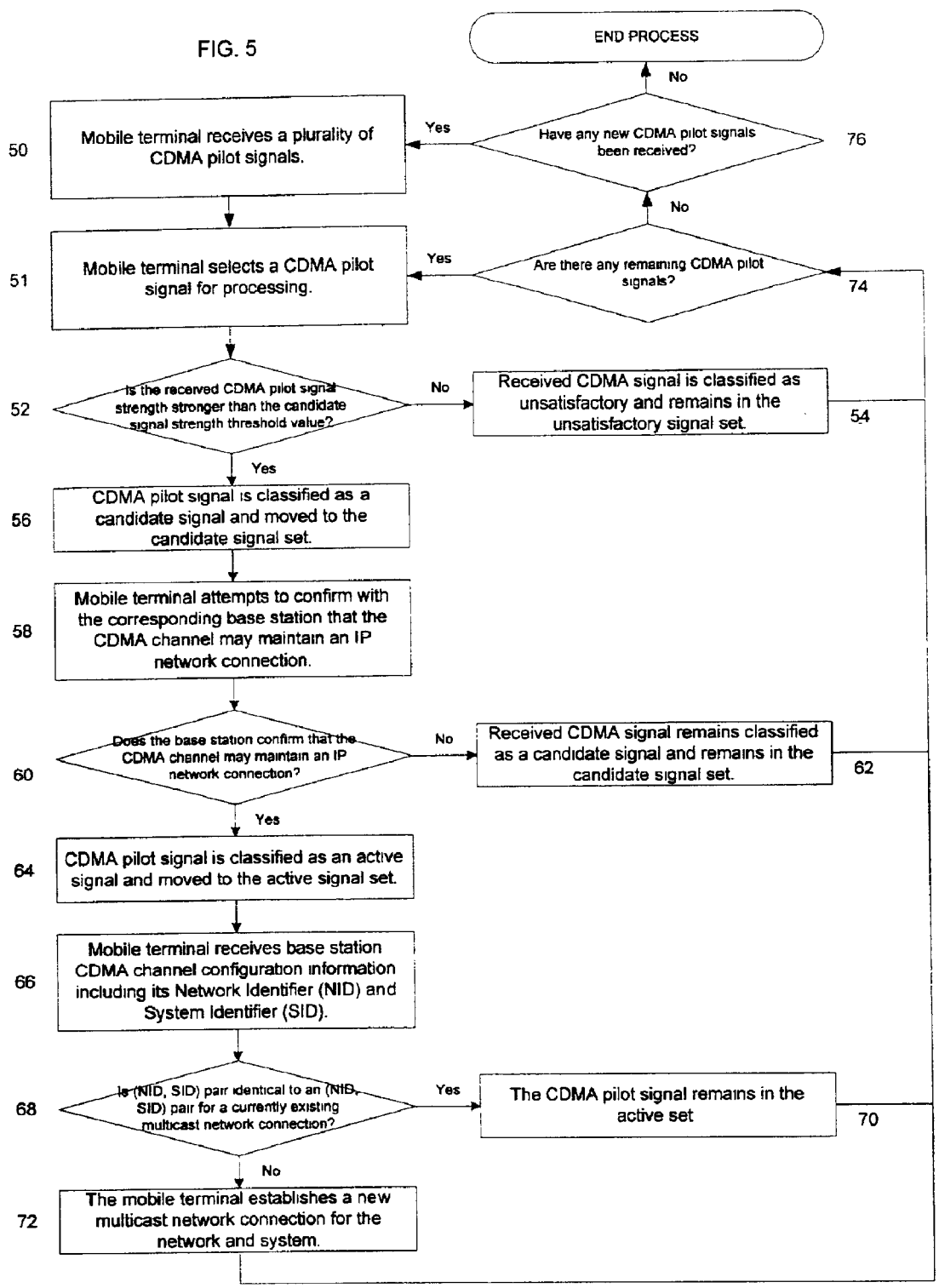

METHOD AND SYSTEM FOR SOFT HANDOFF IN WIRELESS CODE DIVISION MULTIPLE ACCESS (CDMA) INTERNET PROTOCOL (IP) NETWORKS

FIELD OF THE INVENTION

The present invention generally relates to wireless Internet Protocol (IP) networks. More specifically, this invention relates to the soft handoff of mobile terminals in wireless Code Division Multiple Access (CDMA) IP networks.

BACKGROUND OF THE INVENTION

Modem wireless networks commonly employ CDMA techniques to communicate information between a mobile terminal and a base station. Modulating information using CDMA techniques provides an advantage over other modulation methods because CDMA enables multiple base stations to simultaneously use the same channel space to communicate information. Thus, CDMA permits channel overlap between base stations, which has a number of significant advantages in wireless communication systems, including the reduction of interference between mobile terminals and base stations, the exploitation of wireless network multipath components, and the simultaneous modulation and demodulation of information on multiple channels with multiple base stations.

Soft handoff is one method that uses these advantages to reduce error and increase quality of service for wireless CDMA networks. Soft handoff is a steady-state condition wherein a mobile terminal simultaneously communicates identical information with a plurality of base stations. Soft handoff increases transmission and reception diversity at the mobile terminal, thereby increasing information capacity and quality of service while reducing the requisite signal to noise power ratio necessary to reliably communicate information. Soft handoff typically exists throughout a mobile terminal's network connection; nonetheless, the plurality of base stations that communicate with the mobile terminal may change as the mobile terminal physically changes location, thereby requiring the mobile terminal to switch the base stations with which it communicates.

In order to implement soft handoff within a wireless CDMA network, a mobile terminal and the plurality of base stations it communicates with must perform certain functions in order to maintain the plurality of mobile terminal-base station network connections. First, the mobile terminal must receive multiple base station transmissions on the forward link from the base station to the mobile terminal, and then combine these transmissions to aggregate the information sent by the plurality of base stations. This aggregation reduces the information error rate and increases the quality of service for the mobile terminal. Thus, the base stations must use identical CDMA symbols to modulate information and synchronize their transmissions to the mobile terminal on the forward link for the mobile terminal to accurately aggregate and demodulate the redundant transmissions received from the base stations.

In addition, the plurality of base stations receive multiple mobile terminal transmissions on the reverse link from the mobile terminal to each base station. A mobile switching center aggregates or selects appropriate transmissions from the multiple transmissions received by the base stations in order to reduce the error rate and maintain a sufficient quality of service. Thus, the mobile terminal must also synchronously transmit information modulated with identical CDMA symbols to the plurality of base stations for the mobile switching center to aggregate or select CDMA information received from the mobile terminal.

Wireless CDMA voice networks are one common example of a wireless CDMA network that employs soft handoff. In a wireless CDMA voice network, a plurality of base stations are networked together through a common mobile switching center, which connects the base station network to the public telephone network. The base stations communicate with mobile terminals using layer 2 Radio link Protocol (RLP) frames, which include CDMA-modulated information communicated between the base stations and mobile terminals.

For the forward link, the plurality of base stations synchronously transmit identical voice information that has been modulated using identical CDMA modulation symbols. This identical, synchronous, CDMA modulated voice information is received by the mobile terminal, which aggregates the received information and modulation symbols to combine the information received and demodulate the voice information. Even though the received information will vary in power, delay, and quality due to variances within the plurality of base station channels, aggregation enables the mobile terminal to recover the voice information and provide a greater quality of service.

For the reverse link, the mobile receiver modulates voice information using CDMA coding symbols and transmits the CDMA-modulated information to the plurality of base stations simultaneously. The base stations receive the CDMA-modulated information and forward the information to a mobile service center, which selects or aggregates the information received to maximize the quality of service and overcome transmission errors associated with information received at any single base station. The mobile service center then demodulates the CDMA-modulated information to recover the voice information transmitted by the mobile terminal.

A number of features associated with the wireless CDMA voice networks make it relatively easy to implement soft handoff of mobile terminals. First, voice information requires a relatively small bandwidth, thereby permitting the mobile terminal and mobile switching center to employ simple combination and interpolation techniques to demodulate and recover voice information. Second, the CDMA-modulated voice information communicated between the plurality of base stations and the mobile terminal is identical, and thus the information received at either the mobile terminal or the mobile switching center can be combined and selected using relatively simple techniques.

In contrast, the features of wireless CDMA IP networks are markedly different from wireless CDMA voice networks, and make employment of simple aggregation, interpolation, and selection techniques virtually impossible. First, IP information can have a large and variable bandwidth that varies with the mobile terminal, IP application communicating information, and type of information being communicated. Second, wireless IP information communicated between each base station and mobile terminal is not identical because although the message content transmitted is identical, the IP header information for each message varies according to the IP subnet address of the base station communicating with the mobile terminal.

Modern wireless IP architectures use IP based protocols to communicate messages in data packets between mobile terminals and base stations. In these architectures, IP base stations are connected to a wireless IP backbone network through edge routers, which interface the base stations with the backbone network. Each IP base station performs dual functions as both an RF front end for base station-mobile terminal communications, and as a real-time router for IP data packets communicated between the mobile terminals and the wireless IP backbone network. The wireless IP backbone network further includes an IP-based control plan to route messages to and from the base station network that communicates with mobile terminals.

Variations of wireless IP architectures include architectures wherein each base station's coverage area defines an IP subnet. In these "all IP" architectures, each base station has its own IP subnet address, and each base station and mobile terminal requires layer 3 mobility management techniques to communicate messages between the base station and mobile terminal as the mobile terminal crosses a cell boundary. Thus, a mobile terminal may require an IP subnet address change when it crosses from one cell site to another using Mobile IP, DHCP, DRCP, or other layer 3 mobility management techniques.

Supporting soft handoff of mobile terminals in "all IP" architectures is difficult because each base station includes its own IP subnet address. As a result, data packets communicated between the plurality of base stations and mobile terminal in a soft handoff situation are not identical due to their different header information, which is attributable to the different IP subnet addresses for the base stations. Thus, the IP information communicated between the plurality of base stations and mobile terminal cannot be aggregated according to prior art methods for voice data wherein the voice information communicated between each base station and mobile terminal is identical.

SUMMARY OF THE INVENTION

These and other deficiencies and problems associated with soft handoff of mobile terminals in wireless CDMA IP networks are addressed by the present invention, which is a method and system for soft handoff of mobile terminals in wireless CDMA IP networks which utilize IP multicasting of information between a mobile terminal and a wireless CDMA IP network. In accordance with an aspect of our invention, each mobile terminal determines the plurality of multicast IP Network interfaces in the mobile terminal, which interfaces compromise a multicasting group. Further, whenever a message is broadcast in the multicast group, the message is sent to every multicast group participant.

The present invention performs soft handoff of mobile terminals in an IP network by creating a multicast group for each mobile terminal. Soft handoff of a mobile terminal can be visualized as a layer 2 multicasting process, wherein identical information is transmitted to a mobile terminal from an IP network via a plurality of multicast participants, each of which is a network interface that resides at the mobile terminal. When the plurality of multicast participants are established by the mobile terminal, a corresponding number of multicast network connections are created between the IP network and the mobile terminal. The IP network and mobile terminal simultaneously communicate identical information via these separate multicast network connections by sending and responding to messages multicast to the mobile terminal's multicast group. Thus, by establishing a plurality of participants associated with a single mobile terminal, IP data is simultaneously multicast between the mobile terminal and the wireless IP network, thereby establishing soft handoff of the mobile terminal.

In the context of a wireless CDMA IP network, each multicast network connection corresponds to a communication channel between a mobile terminal and a base station. When a plurality of multicast participants are created at a single mobile terminal, each multicast participant corresponds to a multicast network connection between a base station and the mobile terminal. Each multicast network connection originates at one of the base stations and ends at the mobile terminal as a multicast IP network interface. Thus, a plurality of wireless CDMA IP network connections exist between the mobile terminal and the IP network through the plurality of multicast network connections between the base stations and the mobile terminal.

For the forward link, the wireless IP network backbone transmits information to the mobile terminal by broadcasting the information as a multicast message to the mobile terminal's multicast group. The broadcast message is transmitted by the base stations to the mobile terminal via the plurality of multicast network connections between the base stations and the mobile terminal's multicast IP network interfaces. Each multicast message includes the same message information, and thus the same information is sent from the base stations to the mobile terminal through the multicast network connections. Thus, soft handoff of the mobile terminal on the forward link is achieved because the wireless IP network backbone and base stations simultaneously communicate the same information to the mobile terminal through the plurality of multicast network connections.

For the reverse link, the mobile terminal transmits information to the wireless IP network backbone by responding to the sender of the multicast message, which is the wireless IP network backbone. Each multicast group member resides at the mobile terminal as a multicast IP network interface. Thus, when the mobile terminal commands every group participant to respond to the sender of the multicast message, the mobile terminal sends identical messages to the base stations via the multicast network connections. These base stations forward these multicast messages to the wireless IP network backbone. Thus, soft handoff of the mobile terminal on the reverse link is achieved because the mobile terminal simultaneously communicates the same information to the base stations and wireless IP network backbone through the plurality of multicast network connections.

The protocol for adding and dropping participants of a multicast group is dynamic and enables a mobile terminal to establish and terminate multicast IP network interfaces throughout the mobile terminal's IP network connection. The mobile terminal adds and drops participants of its multicast group by broadcasting "join" and "leave" messages, respectively. "Join" messages instruct new IP interfaces to join the mobile terminal's multicast group, whereas "leave" messages instruct a preexisting multicast IP network interface to leave the mobile terminal's group. In this fashion, a mobile terminal can add and remove multicast network connections as it physically transits the wireless IP network.

Establishing soft handoff of the mobile terminal through IP multicasting transfers the advantages and benefits of soft handoff from voice networks to wireless IP networks. First, IP multicasting provides signal diversity via the plurality of multicast network connections between the IP network and mobile terminal, thereby increasing the quality of service by providing a plurality of information channels from which to select and aggregate information. In addition, IP multicasting increases signal capacity by providing a plurality of multicasting network connection channels to communicate information, and decreases information error by allowing information comparison and channel strength evaluation in order to drop weak IP network connections and add strong IP network connections.

The IP multicasting soft handoff method includes an IP multicasting soft handoff protocol, wherein the mobile terminal creates, maintains, and ends multicasting between itself and the IP network. This protocol presumes an initial non-multicasting network connection between the mobile terminal and IP network. After initially establishing an IP network connection, a multicasting agent within the IP network assigns an IP multicasting address to the mobile terminal that identifies the mobile terminal's multicasting group. This IP multicasting address is used by the IP network itself to distinguish the mobile terminal from other mobile terminals, broadcast multicast messages to the mobile terminal, and receive multicast message responses from the mobile terminal.

After the multicasting agent assigns the mobile terminal an IP multicasting address, the mobile terminal then establishes a plurality of network connections and IP network interfaces between itself and the IP network, each of which includes a unique IP address to identify the network connection between the IP network and the mobile terminal. These network connections become the multicast network connections and corresponding multicast IP network interfaces at the mobile terminal once these network connections join the mobile terminal's multicast group In order for an IP network interface to join the mobile terminal's multicast group and become a multicast IP network interface, the mobile terminal broadcasts a "join" message that directs the IP network interface to join the mobile terminal's multicast group as identified by its IP multicasting address. Once the IP network interface joins the mobile terminal's multicast group as a multicast IP network interface, its network connection becomes a multicast network connection between the IP network and the mobile terminal, and multicast information is communicated between the IP network and the mobile terminal via this multicast network connection.

In order for a multicast IP network interface to leave the mobile terminal's multicast group and cease to be an IP network interface, the mobile terminal broadcasts a "leave" message that directs the multicast IP network interface to leave the mobile terminal's multicast group as identified by its IP multicasting address. Once the multicast IP network interface leaves the mobile terminal's multicast group, its network connection ceases to be a multicast network connection and multicast information is no longer communicated between the IP network and the mobile terminal via this network connection.

The mobile terminal determines whether to establish and/or terminate multicast network connections using factors that may include message error rate, channel signal strength, overall network IP constraints, and other metrics and limitations. In general, multicast network connections are added when the mobile terminal establishes its general IP network connection, and are dropped when the mobile terminal terminates its general IP network connection. In addition, multicast network connections are also added and dropped throughout the mobile terminal's general IP network session as factors dictate that the mobile terminal should add or drop multicast network connections.

The present invention includes an IP packet aggregation method for the mobile terminal on the forward link. Multicast messages are communicated using CDMA and broken into individual Radio Link Protocol (RLP) frames that include the multicast message and header information for the RLP frame. Although the actual message content for each RLP frame is identical, the header information that includes multicast network connection and multicast IP network interface information differs based on the particular multicast network connection and interface.

The present packet aggregation method overcomes direct aggregation problems for the different header information of RLP frames by performing CDMA modulation symbol aggregation and selection to create a master IP data packet at the mobile terminal for the forward link. The mobile terminal receives the independent IP data packets which include the plurality of RLP frames through the multicast network interfaces. The mobile terminal aggregates a master IP data packet from these independent IP data packets at the layer 2 physical layer. This master IP data packet is then sent to an application via the layer 3 application layer.

The present invention also includes a function to track CDMA pilot signals and transfer them into the active set of CDMA signals for multicast network connections. A CDMA pilot signal is used by the mobile terminal to gauge the signal strength of a particular CDMA communication channel and determine whether the CDMA communication channel is sufficient to establish a CDMA IP network connection.

The mobile terminal classifies CDMA pilot signals and their corresponding communication channels according to one of three categories. The first category is the active set of CDMA channels that includes CDMA channels strong enough to maintain a CDMA IP network connection. The second category is the candidate set of CDMA channels that includes CDMA channels preliminarily determined to be strong enough to maintain a CDMA IP network connection. The third category is the unsatisfactory set of CDMA channels that includes CDMA channels that are not strong enough to maintain a CDMA IP network connection.

Initially, the mobile terminal receives a plurality of CDMA pilot signals representing the channel strength of CDMA channels for which the mobile terminal may establish a CDMA IP network connection. If the pilot signal strength for a particular CDMA pilot signal is greater than the candidate signal threshold value, then the CDMA pilot signal is placed in the candidate set; otherwise, the CDMA pilot signal is placed in the unsatisfactory set. For candidate CDMA pilot signals, the mobile terminal attempts to confirm with the signal's corresponding base station that the CDMA channel is strong enough for an IP network connection. If this confirmation is successful, the CDMA pilot signal is moved to the active set of CDMA channels that can be used to establish a multicast network connection.

Once a CDMA pilot signal is moved to the active set, the mobile terminal receiver tunes into the corresponding base station's CDMA channel to receive configuration information about the CDMA channel. In particular, the mobile terminal receives the Network Identifier (NID) and System Identifier (SID) that uniquely identifies the CDMA IP network to which the base station belongs and the base station's system identification within the CDMA IP network, respectively. The mobile terminal then determines if the base station is part of a new CDMA IP network. If the (NID, SID) pair is identical to the (NID, SID) pair of a preexisting multicast network connection, then the mobile terminal already has a multicast network connection for that particular network and system and does not need to establish a new multicast network connection for that network and system. In contrast, if the (NID, SID) pair does not match any preexisting multicast network connection, the mobile terminal establishes a new multicast network connection for the new network and system.

BRIEF DESCRIPTION OF THE DRAWINGS

The foregoing and other features of the present invention will be more readily apparent from the following detailed description and drawings of illustrative embodiments of the invention in which:

FIG. 5 is a flowchart of the CDMA Pilot Signal Activation process.

DETAILED DESCRIPTION OF THE PREFERRED EMBODIMENTS

Figure 1:
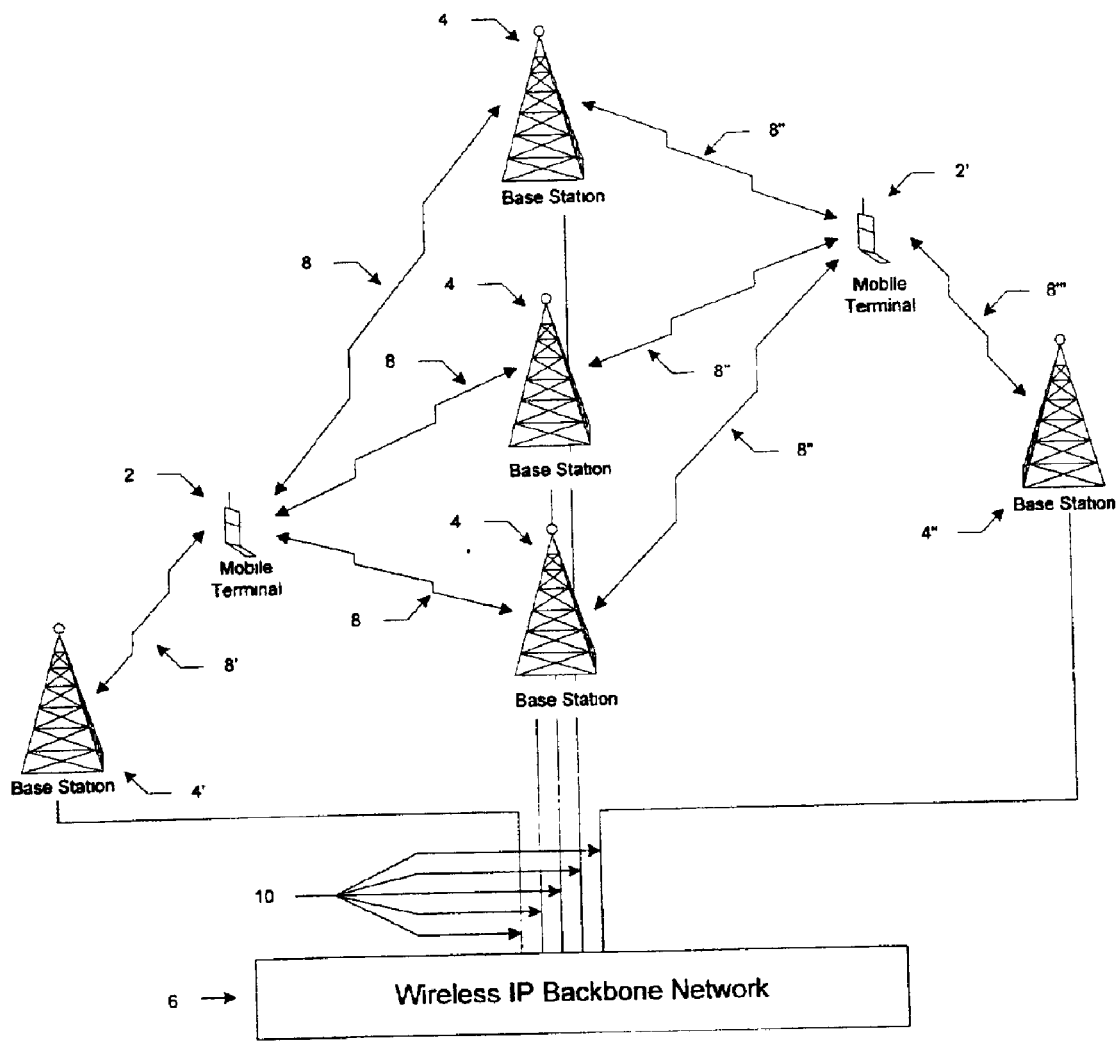
FIG. 1 is a diagram of our CDMA IP Multicasting Soft Handoff System.

Referring now to FIG. 1, therein is shown a diagram of our CDMA IP Multicasting Soft Handoff System. A plurality of mobile terminals 2 and 2' are in a steady-state soft handoff condition with a plurality of base stations 4, 4' and 4" via their multicast network connections 8, 8', 8" and 8'". The base stations 4, 4' and 4" are connected to the wireless IP backbone network 6 via wireless IP backbone network connections 10.

Each mobile terminal 2 and 2' is in soft handoff via multicast network connections with certain base stations. The three base stations 4 communicate with mobile terminal 2 via the three separate multicast network connections 8 between the base stations 4 and mobile terminal 2. The three base stations 4 also communicate with mobile terminal 2' via the three separate multicast network connections 8" between the base stations 4 and mobile terminal 2'. In addition, base station 4' communicates with mobile terminal 2 via the multicast network connection 8', and base station 4" communicates with mobile terminal 2' via the multicast network connection 8'". Thus, mobile terminal 2 is in soft handoff with the four base stations 4 and 4' via its four multicast network connections 8 and 8'. Similarly, mobile terminal 2' is in soft handoff with the four base stations 4 and 4" via its four multicast network connections 8" and 8'". Communications between the mobile terminals 2 and 2' and the wireless IP backbone network 6 take place via wireless IP backbone network connections 10 between the wireless IP backbone network 6 and the base stations 4, 4' and 4".

Whenever the wireless IP backbone network 6 sends information to the mobile terminals 2 and 2', the wireless IP backbone network 6 broadcasts the information as a multicast message to the multicast group associated with mobile terminals 2 and 2', respectively. For instance, when the wireless IP backbone network 6 sends information to mobile terminal 2, it broadcasts a multicast message to the multicast group of mobile terminal 2. Four multicast participants and multicast IP network interfaces are associated with mobile terminal 2 because it includes four multicast network connections 8 and 8' corresponding to the four base stations 4 and 4'. Thus, four identical multicast messages are broadcast by the wireless IP backbone network 6, sent to the four base stations 4 and 4', and transmitted to the mobile terminal 2 via the four multicast network connections 8 and 8'.

The mobile terminal 2 receives the four multicast messages via its four multicast IP network interfaces that correspond to the four multicast network connections 8 and 8'. Each multicast IP network interface corresponds to a multicast participant that resides at the mobile terminal 2. Thus, the mobile terminal 2 has four multicast participants that correspond to its four multicast network connections 8 and 8', and act as four independent multicast IP network interfaces that receive the four multicast messages from the four base stations 4 and 4'. The information content for each of these four multicast messages should be identical, because the same multicast message has been sent to the four multicast participants that reside at the mobile terminal 2. Soft handoff is thereby achieved on the forward link, because the mobile terminal 2 receives identical information from the wireless IP backbone network 6 simultaneously via the four base stations 4 and 4', and their corresponding multicast network connections 8 and 8'.

For the mobile terminal 2 to transmit information back to the wireless IP backbone network 6, it responds to the multicast message sender simultaneously via its four participants. Thus, the mobile terminal 2 sends the same message via its four participants and multicast IP network interfaces over the four corresponding multicast network connections 8 and 8' to the four base stations 4 and 4'. These base stations 4 and 4' receive identical information from the mobile terminal 2 and send this information to the wireless IP backbone network 6 via the wireless IP backbone network connections 10. The wireless IP backbone network 6 receives the four multicast messages with identical information from the four base stations 4 and 4', thereby establishing soft handoff on the reverse link.

In order to establish the four multicast network connections 8 and 8' between the base stations 4 and 4' and the mobile terminal 2, the mobile terminal 2 creates IP network interfaces that correspond to the base stations 4 and 4', and then orders these IP network interfaces to join the mobile terminal's multicast group. Furthermore, mobile terminal 2 and mobile terminal 2' can be represented as the same mobile terminal that has physically traversed the wireless IP network from one location to another. Thus, as mobile terminal 2 physically traverses the wireless IP network to become mobile terminal 2', it drops its multicast network connection 8' associated with base station 4' by ordering the multicast participant associated with base station 4' to leave the mobile terminal's multicast group. Similarly, as mobile terminal 2 physically traverses the wireless IP network to become mobile terminal 2', it also adds a new multicast network connection 8'" associated with base station 4" by creating a new IP network interface corresponding to base station 4" and ordering the IP network interface to join the multicast group associated with the mobile terminal. The multicast network connections 8" remain the same multicast network connections 8 because the original multicast network connections 8 are not dropped as the mobile terminal 2 physically traverses the wireless IP network to become mobile terminal 2'.

Figure 2:
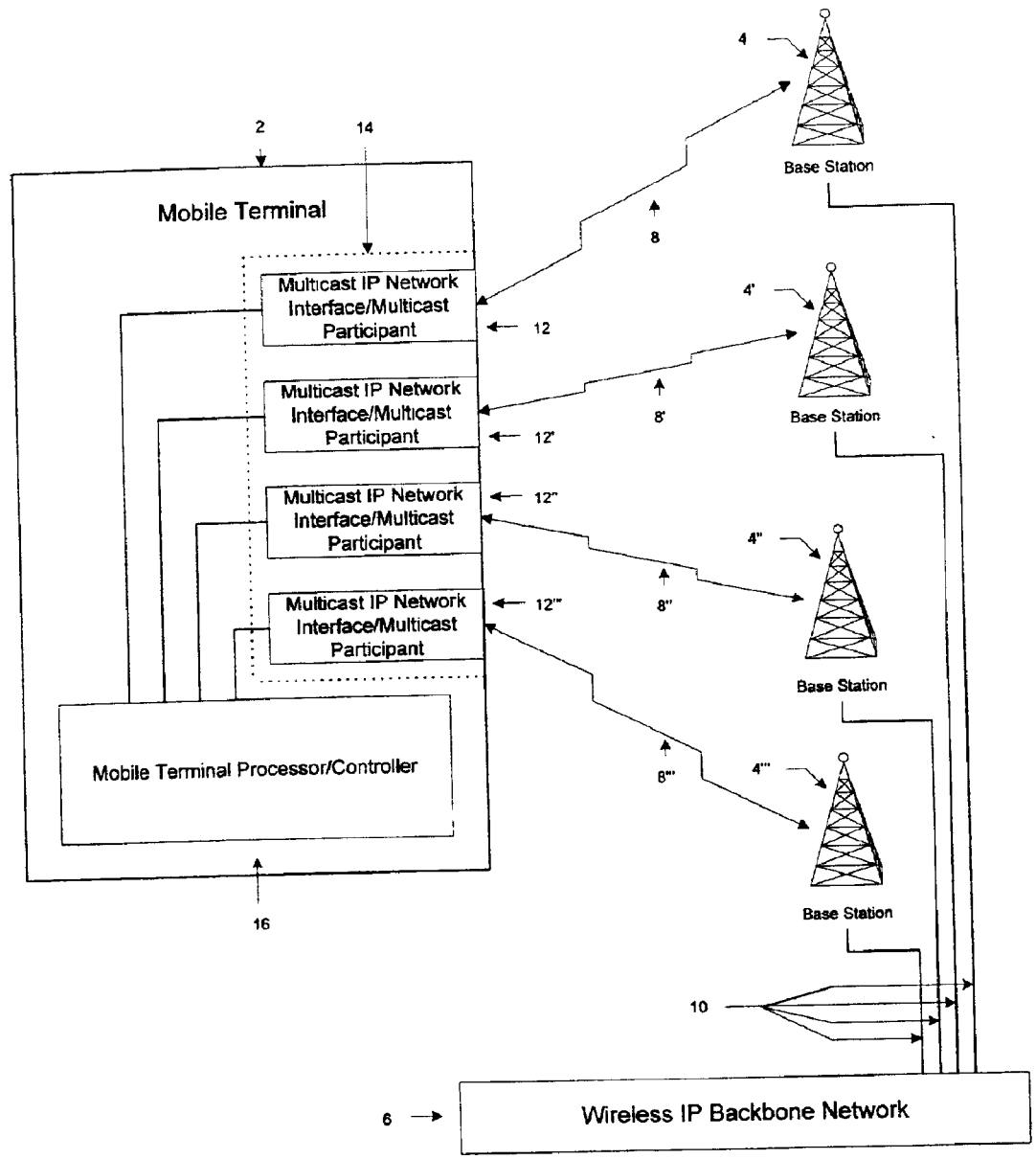
FIG. 2 is a diagram of the Mobile Terminal Multicast Participant and IP Network Interface in accordance with one specific illustrative embodiment of our invention.

Referring now to FIG. 2, therein is shown the Mobile Terminal Multicast Participant and IP Network Interface. Once in soft handoff, the mobile terminal 2 includes a plurality of multicast IP network interfaces and multicast participants 12, 12', 12" and 12'" that are members of the mobile terminal's multicast group 14. These multicast participants 12, 12', 12" and 12'" are established and terminated by the mobile terminal processor and controller 16, which establishes new multicast IP network interfaces 12 for base stations 8 by creating new IP network interfaces and adding these IP network interfaces as multicast participants of the mobile terminal's multicast group 14. The mobile terminal processor and controller 16 also terminates existing multicast IP network interfaces 12 for base stations 8 by dropping the multicast IP network interfaces 12 as multicast participants of the mobile terminal's multicast group 14 and terminating the residual IP network interface.

In the specific configuration shown in FIG. 2, the mobile terminal processor and controller 16 of the mobile terminal 2 has established four multicast IP network interfaces 12, 12', 12" and 12'" that are participants in the mobile terminal's multicast group 14. These four multicast IP network interfaces 12, 12', 12" and 12'" correspond to the communication channels established with the four base stations 4, 4', 4" and 4'", respectively. Thus, four multicast network connections 8, 8', 8" and 8'" exist between the mobile terminal 2 and base stations 4, 4', 4" and 4'" which are connected to the wireless IP backbone network 6. Whenever the wireless IP backbone network 6 transmits information to the mobile terminal 2, it broadcasts the information as a multicast message to the mobile terminal's multicast group 14. Thus, four identical multicast messages are transmitted to the mobile terminal 2 simultaneously from the base stations 4, 4', 4" and 4'" to the multicast IP network interfaces 12, 12', 12" and 12'" via the multicast network connections 8, 8', 8" and 8'", respectively. The mobile terminal 2 processes these four received messages to recover the information transmitted by the wireless IP backbone network 6.

Similarly, when the mobile terminal 2 transmits information to the wireless IP backbone network 6, it instructs its multicast participants 12, 12', 12" and 12'" to respond to the sender of the multicast message simultaneously. Four identical messages are then transmitted from the multicast IP network interfaces 12, 12', 12" and 12'" to the base stations 4, 4', 4" and 4'" via the multicast network connections 8, 8', 8" and 8'", respectively, which are then forwarded to the wireless IP backbone network 6. The wireless IP backbone network 6 processes the four received messages to recover the information transmitted by the mobile terminal 2.

Figure 3:
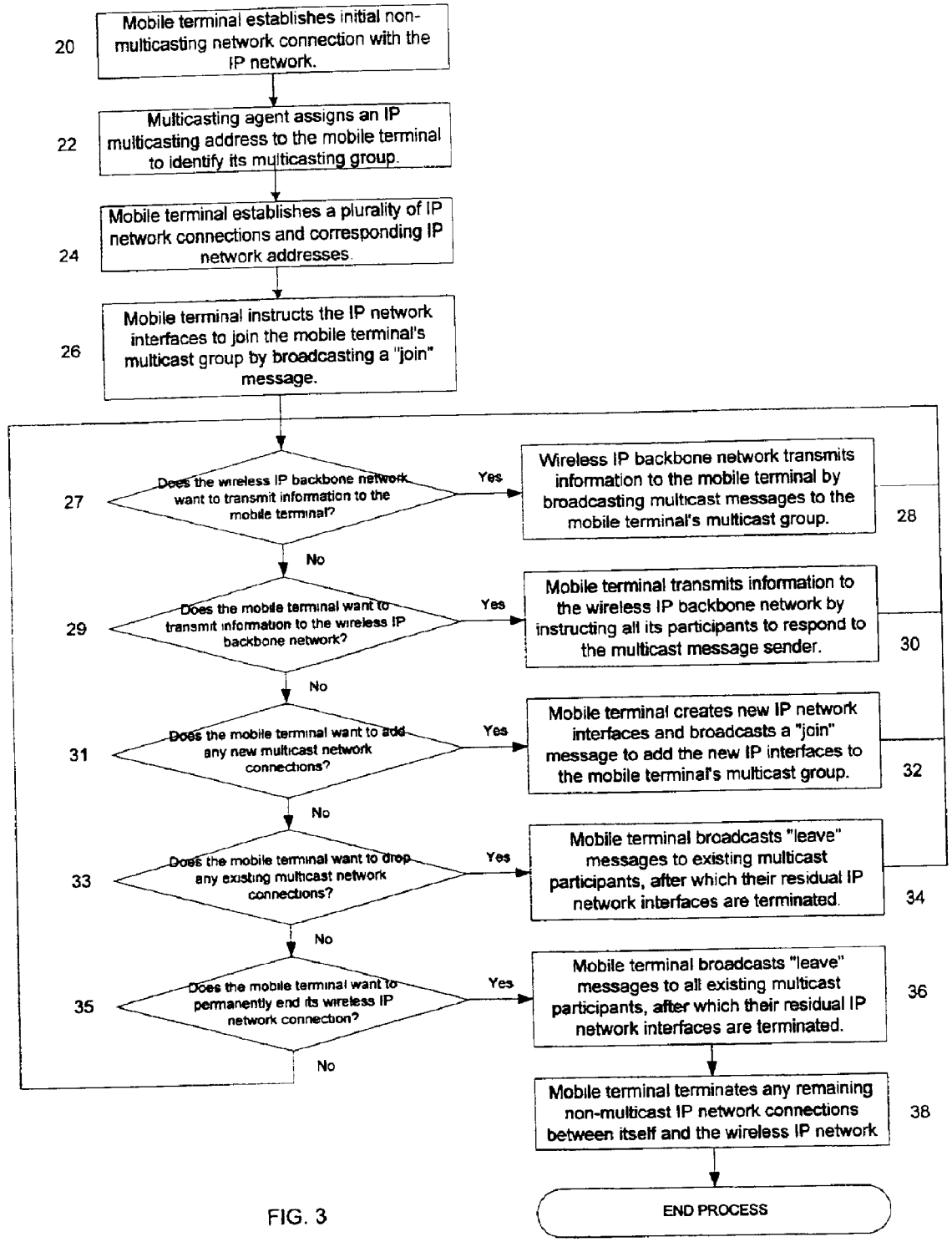
FIG. 3 is a flowchart of the IP Multicasting Soft Handoff process.

FIG. 3 shows the IP Multicasting Soft Handoff process wherein the mobile terminal establishes, maintains and terminates soft handoff with the IP network. Referring now to FIG. 3, the mobile terminal first establishes an initial non-multicasting network connection between itself and the IP network (step 20). A multicasting agent then assigns the mobile terminal an IP multicasting address that identifies the mobile terminal's multicasting group (step 22). Next, the mobile terminal establishes a plurality of IP network connections between itself and the IP network by creating a plurality of IP network interfaces at the mobile terminal, each of which is assigned an IP network connection address (step 24). These IP network interfaces become participants in the mobile terminal's multicast group when the mobile terminal broadcasts a "join" message that instructs these IP network interfaces to become participants of the mobile terminal's multicast group (step 26). At this point, soft handoff of the mobile terminal is established because the mobile terminal's multicast group includes a plurality of multicast IP network interfaces that are located at the mobile terminal and which are participants in the mobile terminal's multicast group. The process then proceeds to step 27.

At step 27, it is determined if the wireless IP backbone network wants to transmit information to the mobile terminal. If the wireless IP backbone network does not want to transmit information to the mobile terminal, then the process proceeds to step 29. If the wireless IP backbone network does want to transmit information to the mobile terminal, then the process proceeds to step 28. At step 28, the wireless IP backbone network transmits information to the mobile terminal by broadcasting the information as a multicast message to the mobile terminal's IP multicasting address (step 28). The process then proceeds to step 27.

At step 29, it is determined if the mobile terminal wants to transmit information to the wireless IP backbone network. If the mobile terminal does not want to transmit information to the wireless IP backbone network, then the process proceeds to step 31. If the mobile terminal does want to transmit information to the wireless IP backbone network, then the process proceeds to step 30. At step 30, the mobile terminal transmits information to the wireless IP backbone network by instructing all participants of its multicast group to respond to the sender of multicast messages (step 30). The process then proceeds to step 27.

At step 31, it is determined if the mobile terminal wants to add new multicast network connections. If the mobile terminal does not want to add new multicast network connections, then the process proceeds to step 33. If the mobile terminal does want to add new multicast network connections, then the process proceeds to step 32. At step 32, the mobile terminal creates new IP network interfaces and adds these new IP network interfaces to the mobile terminal's multicast group by broadcasting a "join" message to these interfaces, thereby creating new multicast network connections (step 32). The process then proceeds to step 27.

At step 33, it is determined if the mobile terminal wants to drop any existing multicast network connections. If the mobile terminal does not want to drop existing multicast network connections, then the process proceeds to step 35. If the mobile terminal does want to drop existing multicast network connections, then the process proceeds to step 34. At step 34, the mobile terminal broadcasts a "leave" message to those participants corresponding to the multicast network connections that the mobile terminal wants to drop, after which the residual IP network interfaces that result from the drop are terminated (step 34). The process then proceeds to step 27.

At step 35, it is determined if the mobile terminal wants to permanently end its wireless IP network connection. If the mobile terminal does not want to permanently end its wireless IP network connection, then the process proceeds to step 27. If the mobile terminal does want to permanently end its wireless IP network connection, then the process proceeds to step 36. At step 36, the mobile terminal drops all remaining multicast network connections by broadcasting "leave" messages to die remaining multicast participants in order to terminate all remaining multicast network connections, after which the residual IP network interfaces that result from the drop are terminated. The mobile terminal then terminates any remaining non-multicasting IP network connections to end its wireless IP network connection (step 38).

Figure 4:
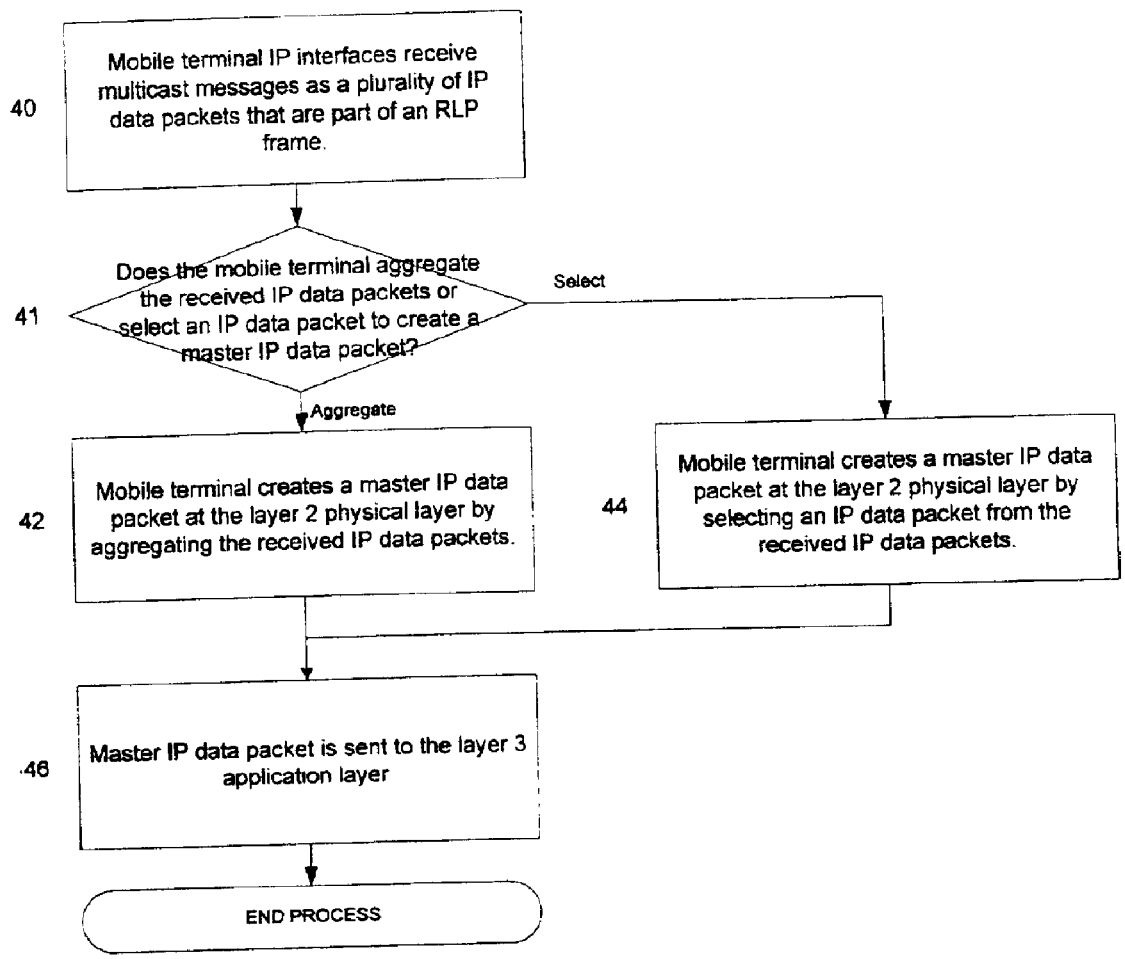
FIG. 4 is a flowchart of the Mobile Terminal Packet Aggregation process.

FIG. 4 shows the Mobile Terminal Packet Aggregation process wherein the mobile terminal aggregates the individual multicast messages received at its multicast IP network interfaces. Referring to FIG. 4, the mobile terminal's multicast IP network interfaces first receive multicast network messages as separate Radio Link Protocol (RLP) frames with independent IP data packets that include the multicast message and header information for the RLP frame (step 40). It is then determined if the mobile terminal will aggregate the received IP data packets to create a master IP data packet, or if the mobile terminal will select one of the received IP data packets to create a master IP data packet (step 41). If the mobile terminal will aggregate the received IP data packets to create a master IP data packet, then the process proceeds to step 42. If the mobile terminal will select a master IP data packet from the received IP data packets to create a master IP data packet, then the process proceeds to step 44.

At step 42, the mobile terminal creates a master IP data packet at the layer 2 physical layer by aggregating the received independent IP data packets into a master IP data packet, and the process then proceeds to step 46. At step 44, the mobile terminal creates a master IP data packet at the layer 2 physical layer by selecting one of the received independent IP data packets to become the master IP data packet, and the process then proceeds to step 46. At step 46, the mobile terminal sends the master IP data packet to the layer 3 application layer for processing.

FIG. 5 shows the CDMA Pilot Signal Activation process wherein received CDMA pilot signals are transferred into the active set of CDMA signals to establish a multicast network connection. The mobile terminal simultaneously performs the CDMA Pilot Signal Activation process on a plurality of pilot signals received by the mobile terminal to determine whether or not to establish new multicast network connections for CDMA channels corresponding to the CDMA pilot signals received.

Referring to FIG. 5, the mobile terminal first receives a plurality of CDMA pilot signals from base stations within the wireless CDMA IP network (step 50). The mobile terminal selects a single pilot signal to process in order to determine whether its CDMA channel can support a multicast network connection (step 51). The mobile terminal first determines if the signal strength of the pilot signal is greater than the threshold signal strength value necessary for the CDMA pilot signal to become a candidate signal for a multicast network connection (step 52). If the CDMA pilot signal strength is less than the candidate signal strength threshold value, then the received CDMA signal is unsatisfactory and classified in the unsatisfactory CDMA signal set (step 54), and the process proceeds to step 74. If the CDMA pilot signal strength is greater than the candidate signal strength threshold value, then the received CDMA signal may be satisfactory for a multicast network connection and it is classified as a candidate CDMA pilot signal within the candidate CDMA signal set (step 56).

Upon becoming a candidate CDMA pilot signal, the mobile terminal attempts to confirm with the base station corresponding to the candidate CDMA pilot signal that its associated CDMA channel may maintain an IP network connection (step 58), and the base station responds by confirming or denying that its CDMA channel may maintain an IP network connection (step 60). The base station determines if it can maintain an IP network connection by using factors including message error rates, channel signal strength, overall network IP constraints, and other metrics and limitations. If the base station denies that the CDMA channel may maintain an IP network connection, then the candidate CDMA pilot signal remains as a candidate signal in the CDMA candidate signal set (step 62), and the process proceeds to step 74. If the base station confirms that the CDMA channel can maintain an IP network connection, then the candidate CDMA pilot signal is classified as an active CDMA pilot signal and moved to the active CDMA signal set (step 64).

Upon becoming an active CDMA pilot signal, the mobile terminal tunes into the base station's configuration information channel and receives configuration information about the base station's CDMA channel including its Network Identifier (ND) and System Identifier (SID) (step 66). The mobile terminal then determines if the CDMA channel's (NID, SID) pair is identical to an (NID, SID) pair of a current multicast network connection (step 68). If so, then the CDMA channel's network and system is already participating in soft handoff of the mobile terminal and there is no need to establish an additional multicast network connection, so the active CDMA pilot signal remains in the active signal set (step 70), and the process proceeds to step 74. If not, then the CDMA channel's network and system is not participating in soft handoff of the mobile terminal, so the mobile terminal establishes a new multicast network connection with the base station over its CDMA channel using the IP Multicasting Soft Handoff protocol to establish a new multicast network connection (step 72), and the process proceeds to step 74.

At step 74, the previously processed pilot signal has been classified as either unsatisfactory, a candidate, active but has not become a new multicast network connection, or active and has become a new multicast network connection. It is then determined if any pilot signals remain to be processed from those received (step 74). If pilot signals remain to be processed, then the process proceeds to step 51, wherein one of the remaining pilot signals is selected and begins the classification process. If no pilot signals remain to be processed, then the process proceeds to step 76. At step 76, it is determined if any new pilot signals have been received. If new pilot signals have been received, then the process proceeds to step 50, wherein the new pilot signals begin the pilot signal classification process. If no new pilot signals have been received, then the process ends because there are no new signals to process, and there are no remaining signals to process. After the process ends, whenever new pilot signals are received by the mobile terminal, the process beings again at step 50, and the new pilot signals are classified.

While the invention has been particularly shown and described with reference to preferred embodiments thereof, it will be understood by those skilled in the art that various changes in form and details may be made therein without departing from the spirit and scope of the invention.

What is claimed is:

1. A method of soft handoff of a mobile terminal in an Internet Protocol (IP) wireless network, said method comprising the steps of:

said mobile terminal obtaining an IP multicasting address;

said mobile terminal creating a multicasting group of a plurality of multicast IP network interfaces wherein each multicast IP network interface is located at said mobile terminal and is based on the IP multicasting address; and simultaneously communicating at the IP level between said multicast IP network interfaces and a plurality of base stations via separate IP channels between said mobile terminal and said plurality of base stations.

2. The method in accordance with claim 1 further comprising dynamically adjusting the plurality of multicast IP network interfaces within said multicasting group.

3. The method in accordance with claim 2 wherein said step of dynamically adjusting comprises said mobile terminal issuing a join message from a particular multicast IP network interface in order to cause said particular multicast IP network interface to be included in said multicasting group.

4. The method in accordance with claim 2 wherein said step of dynamically adjusting comprises said mobile terminal issuing a leave message to a particular multicast IP network interface in order to cause said particular multicast IP network interface to be removed from said multicasting group.

5. The method of claim 2 wherein said step of dynamically adjusting is performed in accordance with at least one of error rate, signal strength, and network constraints.

6. A method of soft handoff of a mobile terminal in an Internet Protocol (IP) wireless network, said method comprising the steps of:

said mobile terminal creating a multicasting group of multicast network interfaces;

simultaneously communicating at the IP level between said multicast network interfaces and a plurality of base stations via separate channels between said mobile terminal and said plurality of base stations;

extracting frames from multicast messages, each frame including a multicast message portion and a header portion; and performing IP packet aggregation for an plurality of multicast message portions in order to produce a master IP data packet.

7. The method in accordance with claim 1 further comprising the step of said mobile terminal tracking CDMA IP pilot signals from a base station to determine the signal strength of a particular communication channel from said base station.

8. A method of soft handoff of a mobile terminal in a Internet Protocol (IP) wireless network, said method comprising the steps of:

said mobile terminal creating a multicasting group of multicast network interfaces;

simultaneously communicating at the IP level between said multicast network interfaces and a plurality of base stations via separate channels between said mobile terminal and said plurality of base stations; and said mobile terminal tracking CDMA IP pilot signals from a base station to determine the signal strength of a particular communication channel from said base station;

wherein said step of tracking CDMA IP pilot signals includes the steps of:

classifying a CDMA pilot signal as a candidate CDMA pilot signal if a signal strength associated with the CDMA pilot signal exceeds a predetermined threshold, otherwise classifying the CDMA pilot signal as unacceptable; and classifying said CDMA pilot signal as an active CDMA pilot signal if a base station associated with said candidate CDMA pilot signal indicates that the particular communication channel associated with the candidate CDMA signal is capable of maintaining an IP level communication from the mobile station through the base station to the network.

9. The method in accordance with claim 1 wherein said simultaneous communication includes the step of transmitting information in a forward direction to said mobile terminal by broadcasting the information as a multicast message from the plurality of said base stations to the multicast IP network interfaces in said multicasting group created by said mobile terminal.

10. The method in accordance with claim 1 wherein said simultaneous communication includes the step of transmitting information in a reverse direction from said multicast IP network interfaces in said mobile terminal to the wireless network in response to a sender of a multicast message to the mobile terminal.

11. A system for soft handoff of a mobile terminal in a wireless network, said system comprising:

a plurality of base stations connected to the wireless network, a mobile terminal including a plurality of multicast IP network interfaces each located at said mobile terminal, and a processor at said mobile terminal, said processor including a medium encoded with processing instructions to obtain an IP multicasting address, create a multicasting group of a number of said plurality of multicast IP network interfaces, each interface being based on the IP multicasting address, and cause simultaneous communication at the IP level between said number of said plurality of multicast IP network interfaces at said mobile terminal and a number of said plurality of base stations.

12. The system in accordance with claim 11 wherein said medium is further encoded with processing instructions to dynamically adjust the ones of said plurality of multicast IP network interfaces included in said multicasting group.

* * * * *

UNITED STATES PATENT AND TRADEMARK OFFICE
CERTIFICATE OF CORRECTION

PATENT NO.       : 6,865,167 B2
APPLICATION NO.  : 09/775864
DATED            : March 8, 2005
INVENTOR(S)      : Famolari et al.

It is certified that error appears in the above-identified patent and that said Letters Patent is hereby corrected as shown below:

In the Specification

In Column 1, Line 15, delete "Modem" and insert -- Modern --, therefor.

In Column 2, Line 10, delete "Radio link" and insert -- Radio Link --, therefor.

In Column 5, Line 24, delete "group" and insert -- group. --, therefor.

In Column 8, Line 60, delete "stations 8" and insert -- stations 4 --, therefor.

In Column 8, Line 64, delete "stations 8" and insert -- stations 4 --, therefor.

In Column 10, Line 41, delete "to die" and insert -- to the --, therefor.

In Column 11, Line 60, delete "(ND)" and insert -- (NID) --, therefor.

In the Claims

In Column 13, Line 11, in Claim 6, delete "an plurality" and insert -- a plurality --, therefor.

In Column 13, Line 19, in Claim 8, delete "in a" and insert -- in an --, therefor.

Signed and Sealed this
Fourth Day of November, 2014

Michelle K. Lee
*Deputy Director of the United States Patent and Trademark Office*